(12) United States Patent
Maturana et al.

(10) Patent No.: US 7,203,575 B2
(45) Date of Patent: Apr. 10, 2007

(54) DECENTRALIZED AUTONOMOUS CONTROL FOR COMPLEX FLUID DISTRIBUTION SYSTEMS

(75) Inventors: Francisco Paul Maturana, Mayfield Heights, OH (US); Kenwood Henry Hall, Hudson, OH (US); Raymond John Staron, Richmond Heights, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 489 days.

(21) Appl. No.: 10/737,384

(22) Filed: Dec. 16, 2003

(65) Prior Publication Data

US 2004/0204784 A1 Oct. 14, 2004

Related U.S. Application Data

(60) Provisional application No. 60/433,892, filed on Dec. 16, 2002.

(51) Int. Cl.
*G05D 7/00* (2006.01)

(52) U.S. Cl. .................................................. 700/282
(58) Field of Classification Search ............... 700/282, 700/286, 291, 295–297
See application file for complete search history.

(56) References Cited

U.S. PATENT DOCUMENTS

| | | | |
|---|---|---|---|
| 5,504,837 A * | 4/1996 | Griffeth et al. ............... 706/10 |
| 5,995,602 A * | 11/1999 | Johnson et al. ............. 379/116 |
| 6,026,349 A * | 2/2000 | Heneman ..................... 702/60 |
| 6,055,571 A * | 4/2000 | Fulp et al. .................. 709/224 |
| 6,269,157 B1 * | 7/2001 | Coyle .................... 379/114.01 |
| 6,411,603 B1 * | 6/2002 | Ahuja et al. ................ 370/238 |
| 6,450,254 B1 * | 9/2002 | Hoyle et al. ................ 165/200 |
| 6,459,944 B1 | 10/2002 | Maturana et al. |
| 6,516,249 B1 * | 2/2003 | Hoyle et al. ................ 700/282 |
| 6,647,300 B1 | 11/2003 | Balasubramanian et al. |
| 7,047,227 B2 * | 5/2006 | Batachia et al. .............. 706/60 |
| 2001/0021247 A1 * | 9/2001 | Esfandiari et al. .......... 379/225 |
| 2003/0023540 A2 * | 1/2003 | Johnson et al. ............... 705/37 |

* cited by examiner

*Primary Examiner*—M. N. Von Buhr
(74) *Attorney, Agent, or Firm*—Keith M. Baxter; William R. Walbrun

(57) ABSTRACT

A control system for a complex distribution network uses autonomous control units that may bid among themselves to reconfigure the distribution network in light of fluctuation demand or failures. The autonomous control units may also be enlisted to detect and isolate as well as reconfigure the network to correct for the damage.

28 Claims, 5 Drawing Sheets

DECENTRALIZED AUTONOMOUS CONTROL FOR COMPLEX FLUID DISTRIBUTION SYSTEMS

CROSS-REFERENCE TO RELATED APPLICATIONS

This application is based on provisional application 60/433,892 filed Dec. 16, 2002 and entitled "Agent-Based Active Diagnostics System for Complex Distribution Networks", hereby incorporated by reference.

STATEMENT REGARDING FEDERALLY SPONSORED RESEARCH OR DEVELOPMENT

- - -

BACKGROUND OF THE INVENTION

The present invention relates to computerized control systems and in particular to a control system for controlling fluid distribution in a dynamic distribution network.

Systems for distributing fluids such as fuel, liquid feedstocks, refrigerants, compressed air, fluidized solids, gases, and fluid-like quantities like electricity (subject to pressure and flow through a conduit), are an important component of manufacturing operations, chemical plants, office buildings, and large equipment. Often these distribution systems have complex networks of conduit whose configurations can change with demand or to accommodate failure of portions of the distribution system.

An example distribution system is chilled-water distribution in a modern warship. Chilled-water provides cooling for critical electronic components and machines as well as cooling for crew quarters and work areas.

Chilled-water must be provided to high priority users even in the face of damage to the distribution network, such as may occur in wartime. Accordingly, the chilled-water is distributed through a network of redundant pipeways connected by a valve system that allows chilled-water to be routed around damaged pipe sections if necessary. Additional reliability is obtained by providing multiple chilled-water producers that may be flexibly connected to any given chilled-water consumer through the redundant pipeways.

Controlling such a chilled-water system is extremely difficult. The multiple chilled-water producers, valves, and pipeways provide a large number of configurations, each of which must be considered when programming the control system. The control system must be programmed to accommodate varying and competing demands for chilled-water as chilled-water consumers switch in and out over time. Finally, the control system must respond to highly unpredictable damage to the distribution system such as may occur in battle.

Conventional programmed control systems can effectively provide only a limited range of responses covering easily anticipated problems and may require additional human supervision and/or manual intervention undercutting the benefits that could be obtained from completely automated control.

BRIEF SUMMARY OF THE INVENTION

The present invention provides an automatic control system for complex distribution systems that does not attempt to anticipate all possible combinations of demand and network failure and map them to a particular network configuration. Instead, critical components of the distribution system are associated with autonomous control units (ACU's) that are invested with a general decision-making framework that allows them to negotiate among themselves to reconfigure the network in response to unanticipated damage or changes in demand. In the preferred embodiment, the ACU use a "market-model" in which they bid for resources and evaluate solutions based on costs and available money. The result is a highly efficient automatic control of a complex network that yields efficient solutions for unexpected situations far faster than could be obtained by manual supervision.

Specifically, the present invention provides a control system for a distribution network having a set of distribution endpoints including at least one producer and consumer interconnected by a set of distribution resources including: a plurality of distribution lines joining the producers and consumers and switchable gates interconnecting the distribution lines, producers, and consumers. The control system is made up of: (a) a set of autonomous control units associated with at least some of the distribution endpoints, and (b) a set of autonomous control units associated with at least some of the distribution resources. The autonomous control units execute a stored program and communicate with each other to: (a) implement a set of money rules to allocate money resources to the consumers and a set of pricing rules for distribution resources, (b) bid for distribution resources on behalf of consumers based on the money rules and pricing rules, and (c) select distribution paths between producer and consumer endpoints using distribution resources based on bid responses.

It is thus one object of the invention to provide an improved method for controlling complex networks that can respond to unexpected situations. The bidding model allows the ACU's to work out specific solutions (e.g., how to route chilled-water) with only general guidance (e.g. knowledge of the consumer needing water and global knowledge as communicated by other ACU's). The market-model provides a familiar set of rules for distributed decision making.

It is another object of the invention to provide a control system for complex distribution networks that requires less programming for a given application. Once the ACU's are programmed for a particular distribution resource, new applications using that resource may reuse virtually all of that programming. For the same reason, the control system is highly scalable.

The pricing rules may assign higher prices to distribution between distribution endpoints requiring a greater number of distribution resources. Alternatively or in addition, the pricing rules may assign higher prices to valves that serve to segregate distributions related to separate producers.

It is thus another object of the invention to provide simple but flexible pricing rules. Tallying the number of resources used causes the system to tend toward simple distribution solutions. A simple price differential can cause the system to avoid certain valves such as those used to separate redundant chilled-water producer sources.

The money rules may provide greater money resources to a bidder if no successful bids are obtained and/or may provide initial money resources to a bidder based on the price of a previously accepted bid.

It is another object of the invention to provide a simple money rule that tends toward stable and efficient solutions. By starting at the last successful price, previous bid activity is leveraged to provide faster solutions. Allowing the money to increase if there are no successful bids ensures bid success if possible. The money rules also limit the depth of the search to improve the efficiency of the discovery algorithm by pruning uninteresting combination from the search.

The autonomous control units may be implemented in spatially separated hardware intercommunicating on a network and/or the stored program may be divided among the autonomous control units. The autonomous control units may be located proximate to the distribution resources or distribution endpoints with which they are associated.

It is thus another object of the invention to provide a control system that may be decentralized enhancing the ability of the system to resist spatially localized damage.

The autonomous control units may participate in multiple bids related to different consumers so long as the bids require consistent use of the distribution resource.

Thus, it is another object of the invention to provide a self-organizing control system that supports the ability of a pipeway to feed multiple consumers.

The autonomous control units associated with valves may receive an instruction causing them to close and remove themselves from future bidding.

It is thus another object of the invention to allow pipeway failures to be isolated.

The consumers may be assigned priorities and when bids associated with competing consumers cannot be satisfied, the stored program executed by the autonomous control units may select among competing consumers by priority.

It is therefore another object of the invention to allow the control system to simply differentiate between critical and non-critical consumers.

The autonomous control units associated with consumers may receive an instruction causing them to remove themselves from the bidding process and to release their distribution resources.

It is therefore another object of the invention to allow the system to quickly move between different modes, such as emergency and non-emergency modes, where different consumers are accepted in the bidding process.

The bidding may be propagated only between distribution resources directly connected by pipes.

It is another object of the invention to reduce the network load and time required to collect bids by using the physical topology of the pipes to truncate the bidding domain.

The network may provide redundant distribution producers and redundant pipes.

Thus, it is another object of the invention to provide control for a highly reliable distribution system having increased complexity because of the redundant components.

These particular objects and advantages may apply to only some embodiments of the invention covered by only some of the claims and thus do not define the scope of the invention.

DETAILED DESCRIPTION OF THE PREFERRED EMBODIMENT

Figure 1:
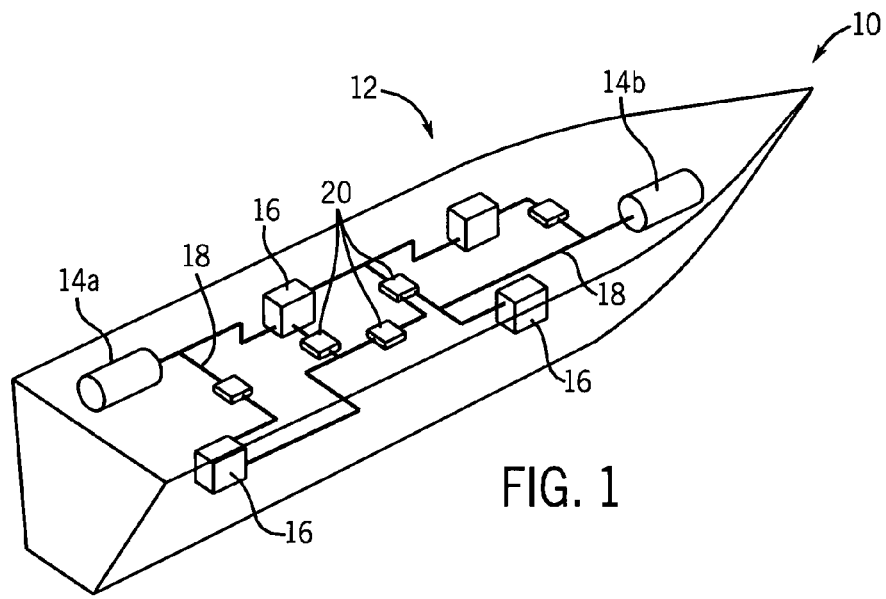
FIG. 1 is a phantom view of a warship showing a simplified chilled-water distribution system having multiple chilled-water producers, chilled-water consumers and valves.

Referring now to FIG. 1, a naval vessel 10 may include a chilled-water distribution system 12 having redundant and spatially separate chilled-water producers 14a and 14b providing chilled-water to multiple distributed chilled-water consumers 16a through 16c. The distribution is through a network of pipes 18 and control valves 20 such as to provide for multiple different paths of connection between any chilled-water producer 14 and chilled-water consumer 16.

At times, particular chilled-water producers 14, pipes 18, or valves 20 may be destroyed or rendered inoperative. During operation, chilled-water consumers 16 may come on and go off-line at different times depending on their needs.

Figure 2:
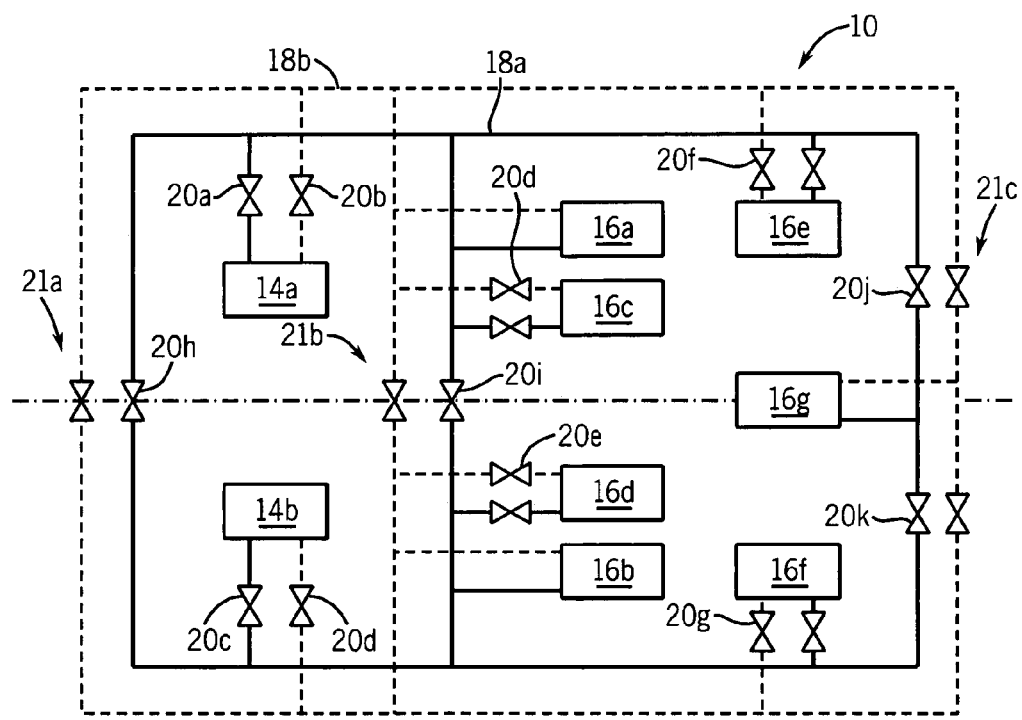
FIG. 2 is a schematic diagram the distribution system of FIG. 1 showing redundant chilled-water supply and return pipes leading to chilled-water consumers and chilled-water producers.

Referring now to FIG. 2, the two chilled-water producers 14a and 14b may each be connected to a supply pipe 18a and a return pipe 18b to provide a closed loop operation. Chilled-water producer 14a is connected through valve 20a to supply pipe 18a and through valve 20b to return pipe 18b while chilled-water producer 14b is connected through valve 20c to supply pipe 18a and through valve 20d to return pipe 18b. For the purpose of descriptive clarity, only the supply pipes 18a and its valves 20 will be described henceforth with it being understood that corresponding return pipes 18b and return pipe valves 20 will be present.

Directly connected to supply pipe 18a, to receive constant water flow therefrom, are chilled-water consumers 16a, 16b and 16g. Chilled-water consumers 16a and 16b are not subject to individual control but may be shut off by operation of valves 20 elsewhere in the system.

More importantly, other chilled-water consumers 16c through 16g may connect to the supply pipe 18a through valves 20 allowing them to be individually connected and disconnected from chilled-water. Specifically, chilled-water consumer 16c connected to supply pipe 18a via valve 20d, chilled-water consumer 16d connects via valve 20e, chilled-water consumer 16e connects via valve 20f, and chilled-water consumer 16f connects via valve 20g.

Generally, the chilled-water distribution system 12 is divided into redundant halves corresponding to the two chilled-water producers 14a and 14b. These halves are normally separated by segregation valves 20h and 20i, each associated with a pipeway branch 21a and 21b connecting the two halves, and 20j and 20k which connect in series across an additional branch 21c between the two halves. Chilled-water consumer 16g is connected at the junction of segregation valves 20j and 20k so as to freely receive chilled-water from either half. During normal operation, the segregation valves 20h, 20i, and 20j and 20k prevent mixing of chilled-water from chilled-water producer 14a with chilled-water from chilled-water producer 14b. This segregation provides an additional reliability against catastrophic failure of a pipe that, where the two halves join, might cause water loss to the entire system.

The topology of the network shown in FIG. 2 is generally arbitrary except that it allows different chilled-water producers 14 to be flexibly connected through valves 20 to a given chilled-water consumer 16 through at least two different pipeway paths. Thus, for example, chilled-water producer 14a may provide chilled-water to chilled-water consumers 16f by passing the water through valve 20a, 20h and valve 20g, or alternatively, through valve 20a, valve 20j, 20k, and 20g. In this case, a third possible path is provided through valve 20a, valve 20i, and 20g. Thus, damage to pipes in the system can be overcome. Higher degrees of redundancy and additional numbers of sources are also possible.

Figure 3:
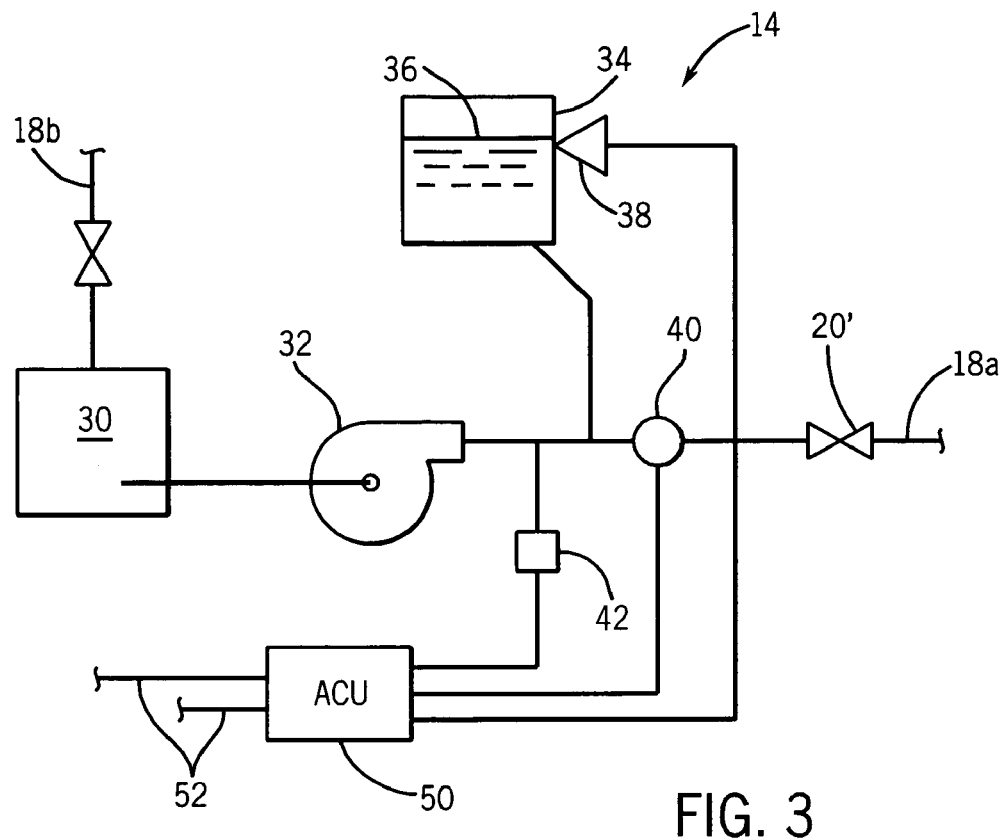
FIG. 3 is a block diagram of one chilled-water producer showing its components and sensors, including a heat exchanger, pump, accumulator tank, and flow and pressure sensors, which may be used to detect system failures and showing a connected control module implementing one or more autonomous control units associated with the chilled-water producer.

Referring now to FIG. 3, a given chilled-water producer 14 includes a heat exchanger/chiller 30 receiving heated water from a return pipe 18b through a valve 20 (20b or 20d in the example of FIG. 2) and providing chilled-water to a pump 32 which in turn provides it to a valve 20' (20a or 20c in the example of FIG. 2) to the supply pipe 18a. The output of the pump 32 communicates with an accumulator tank 34 of a type well known in the art for closed loop water systems having a water level 36 that may be sensed by water level sensor 38. The flow of water out of pump 32 may be detected by flow sensor 40 and the pressure of this water may be sensed by pressure sensor 42.

Signals from water level sensor 38, flow sensor 40, and pressure sensor 42 may be received by input circuits of a control module 50 such as a ControlLogix programmable control module commercially available from Rockwell Automation, Inc., the beneficial assignee of the present invention. The control module 50 incorporates a computer processor and memory for implementing one or more autonomous control units (ACU's) as will be described. The control module 50 may also provide output circuits to provide signals controlling the pump 32 and operation of the chiller 30 using a control program "stub" being a part of each ACU implemented by the control module 50, as will be described. The control module 50 may communicate by a single or multiple redundant networks 52 such as Control Net or Ethernet having separate network media to resist failure.

Autonomous Control of the Distribution Network

Figure 4:
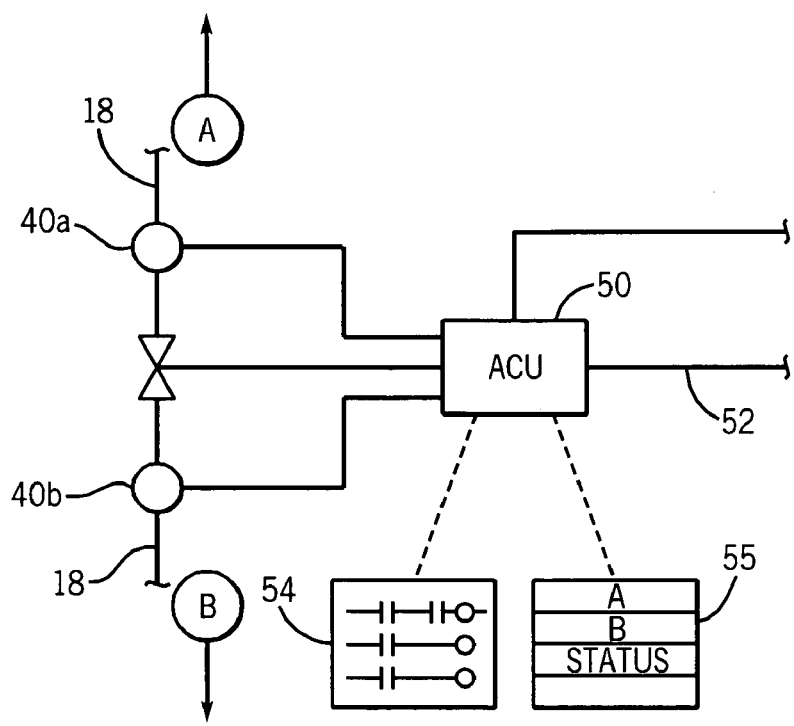
FIG. 4 is a detailed block diagram of one valve and optional sensor connected to a control module implementing an associated autonomous control unit and showing information held by the autonomous control unit during operation.

Referring now to FIG. 4, each valve 20 may also be connected to a control module 50 connected to network 52 so the control module 50 may operate the opening or closing the valve 20 using an associated ACU implemented by the control module 50. In the simplest embodiment, the control module exchanges signals with the valve 20 only providing for operation of the valve and confirmation of that operation. In an alternative embodiment, however, as shown, the valve 20 may have an upstream pressure gauge 40a and a downstream gauge 40b which may provide signals to the control module 50 which may use these signals to deduce a pressure drop across the valve 20 indicating water flow. Knowing flow plus pressure can be used to deduce network conductance for detecting errors as will be described below.

Each chilled-water consumer 16 (shown in FIG. 3) may also be associated with an ACU implemented in a control module 50. By means of the ACU, each chilled-water consumer 16 may initiate a request for chilled-water based on internal considerations, for example, a temperature rise in the associated equipment or an activation signal being received by the associated equipment.

Referring again to FIG. 4, the amount of application specific information that must be programmed into the ACU is limited allowing rapid configurations of distribution control systems. As mentioned, each ACU may include a control logic stub 54, for example, implemented in relay logic or other common control program languages, that provides low level control of the valve 20 or chilled-water producer 14 or chilled-water consumer 16 and may include, in the case of a valve, logic for preventing both simultaneous opening and closing signals, for detecting valve jamming or other failure, monitoring safety, and allowing manual operation. The control logic stub may be pre-written as part of a library for a particular device such as a valve 20 or chilled-water producer 14 or chilled-water consumer 16. The control logic stub 54 may also provide variable data holding certain status information about the associated device (e.g., valve open, valve closed, valve failure) that may be read by the ACU.

The ACU also includes limited application specific information about the pipeway topology in an ACU data area 55. In the preferred embodiment, this topology information can be simply the identity of the ACU(s) associated with any upstream resources and the ACU(s) associated with any downstream resources. The cooperative operation of the ACU's allows this fragmentary information to be effectively assembled into knowledge about distribution paths. This limited need for information by the ACU's makes the system highly scalable and simple to implement in a variety of distribution systems. When the ACU data area is in an ACU associated with a chilled-water consumer 16, it may also include a priority of the chilled-water consumer as will be described below which provides a stable resolution of conflicts between chilled-water consumers 16 as will be described below.

Each ACU also includes programs (not shown) that control the behavior of the ACU as an ACU in bidding responding to bids and communicating with other ACU's. Generally these programs are not application specific and thus do not require modification for each application. Communication between ACU's may be provided using standard protocols such as described by The Foundation for Intelligent Physical Agents (FIPA) (at www.fipa.org) communicating bidding and other messages as taught in U.S. Pat. No. 6,647,300 entitled: Bidding Partner Cache For Autonomous Cooperative Control System; U.S. Pat. No. 6,459,944 entitled: Self-Organizing Industrial Control System Using A Specific Process To Evaluate Bids; U.S. Pat. No. 6,430,454 entitled: Self-Organizing Industrial Control System Using Iterative Reverse Modeling To Evaluate Bids; U.S. Pat. No. 6,272,391 entitled: Self Organizing Industrial Control System Importing Neighbor Constraint Ranges, and U.S. Patent Application 2003/78678A1 entitled: Language Structure For Autonomous Cooperative Control System, each beneficially assigned to the present assignee and hereby incorporated by reference.

Figure 5:
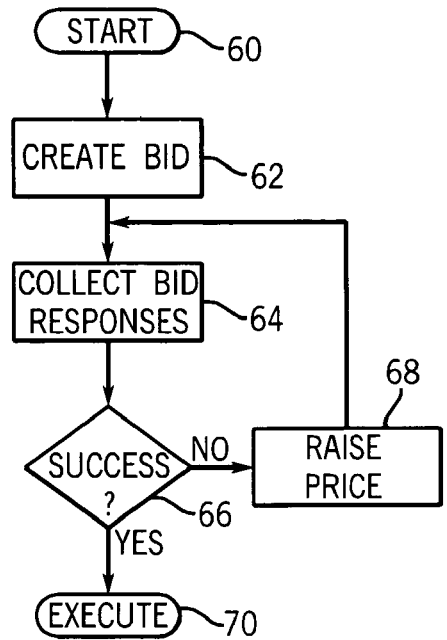
FIG. 5 is a flowchart depicting overall operation of the control system as implemented in a distributed fashion by many autonomous control units.

Referring now to FIG. 5, once each ACU is provided with its applications specific data, they may intercommunicate to organize themselves to distribute chilled-water in a bidding process. As indicated by start block 60, bidding may be initiated upon start-up of the system, a chilled-water consumer 16 (or other new resource) coming on-line, or by loss of a resource by failure or damage. The most common example will be that of a chilled-water consumer 16 requesting chilled-water as it reaches a threshold temperature at which cooling is required. At this time, chilled-water consumer 16 creates a bid request as indicated by process block 62 which is forwarded to other resources that might satisfy the bid request. The requirements of the bid request are expressed in a job description language of a type described in the above-referenced patents and in this case simply describing the need for a chilled-water source, a distribution path to a particular destination, at under a particular money limit. The other resources to which bid requests are sent are found by consulting a directory providing addresses of other ACU's having the capabilities required in the bid request.

In the present invention the bid request is initially forwarded only to chilled-water producers 14a and 14b. Chilled-water producers 14 keep track of their current loads in the form of executing bids from other chilled-water consumers 16 and will only accept a bid request if they have uncommitted capacity, or if the bid request comes from a chilled-water consumer 16 having a priority higher than a priority of existing chilled-water consumers 16 serviced by the chilled-water producer 14. In this latter case, the lowest priority chilled-water consumer is notified to disconnect itself.

At process block 64 each of the chilled-water producer 14a and 14b, having possibly satisfied the bid request requirements of providing a source of chilled-water (depending on their status and current loads), send sub-bid requests to valves 20 that might satisfy the bid request requirement of a path to the destination. The valves 20 stand as proxies for the pipes to which they are connected. Each valve 20 examines the bid request requirements, the available money, and makes a determination whether it can respond.

When a given ACU completes a bid request, typically a valve connected to the chilled-water consumer 16 making the request, the bid response and path (listing each of the resources in order from source to destination) describing a "job response" are collected and returned to the chilled-water producer 14. Bid requests that cannot complete in a given time or other limit, or for reasons of excess cost, are abandoned.

At process block 66, a determination is made by each chilled-water producer 14a and 14b as to the best job response meeting the price and capability requirements. Under a commonly implemented money rule for each bidder (e.g. a chilled-water consumer 16), the bid request may be associated with a money limit which is either an arbitrarily chosen initial amount (e.g. 700) or a number slightly above the last successful job response for this chilled-water consumer 16. This latter rule encourages efficient bidding (by quickly truncating expensive paths), and system stability (by encouraging repeated use of previous solutions as characterized by price).

If no job responses have been provided (e.g. no bid requests have successfully completed) at the given money limit, then at process block 68, the money limit is increased under a commonly implemented money rule and the process repeated until a success is obtained at decision block 66 and the winning bid response is implemented at the execute block 70.

Figure 6:
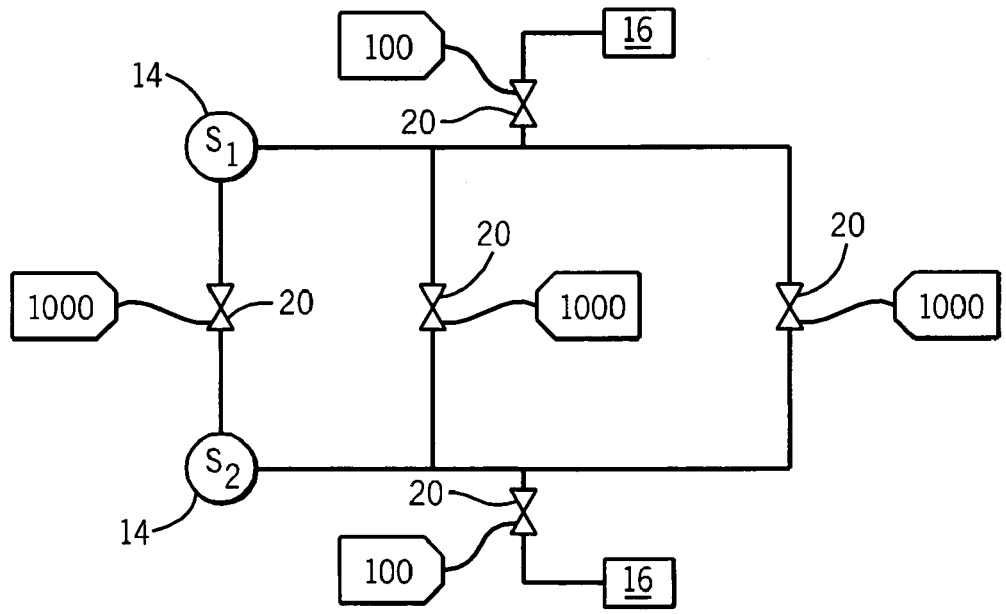
FIG. 6 is a figure similar to that of FIG. 2 showing operation of valve pricing to provide segregation of the chilled-water producers.

Referring to FIG. 6 in the present invention, the cost of a job response in the preferred embodiment is determined by a pricing rule that considers simply the sum of the cost of each valve 20 needed to connect the chilled-water producer 14 to the chilled-water consumer 16. Alternative cost mechanisms which consider the flow characteristics of the paths, for example, their hydrodynamic resistance, or other characteristics can also be used. In the preferred embodiment of the invention, the segregation valves 20 are given a higher price (e.g. 1,000) than the price (e.g. 100) of other valves 20 that do not serve in the capacity of segregation. As a result, successful job responses will tend to use valves 20 other than the segregation valves 20 thus preserving segregation between the two halves of the chilled-water distribution system 12 to the extent possible. As mentioned above, however, if a successful job response cannot be found without using segregation valves, for example because of extensive damage to the chilled-water distribution system 12, then the raising of the price at process block 68 of FIG. 5 raises the amount that can be bid to a much higher amount, e.g., 7,000, to ensure that chilled-water can be obtained in these circumstances.

Figure 7:
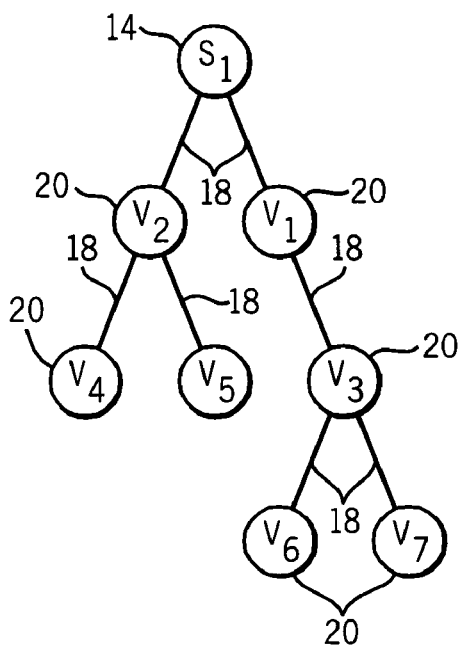
FIG. 7 shows an example configuration of the network of FIG. 2 such as may be developed by bidding autonomous control units which develop distribution paths.

Referring to FIG. 7, in order to reduce the number of bid requests processed, bid requests are only sent to valves connected by pipeways to the chilled-water producers 14a and 14b, that is, the bid requests follow the physical pathways of the distribution network. This pathway is collectively known by valves 20 which, as has been described, each know their upstream and downstream connection. Thus chilled-water producer 14 $S_1$ may be connected by pipes 18 to valve $V_1$ and valve $V_2$ and accordingly forwards the job description language bid request only to valve $V_1$ and valve $V_2$ and not from valves 20 to which it is not connected by pipes 18. Likewise, valve $V_1$ may be connected to valve $V_3$ and therefore forwards a bid request only to that valve, while valve $V_2$ may be connected to valve $V_4$ and valve $V_5$ and therefore forwards bid requests only to those valves 20.

Figure 8:
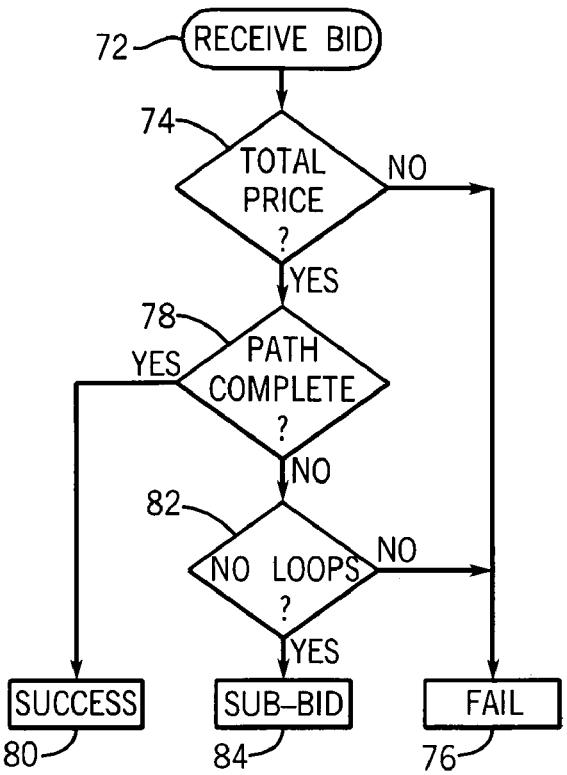
FIG. 8 is a flowchart depicting operation of an individual autonomous control unit associated with a valve such as automatically develops the paths of FIG. 7.

Referring now to FIG. 8, a given ACU receiving a bid request, as indicated by process block 72, after it determined that it has the necessary capability, evaluates whether the total price of the bid responses as so far accumulated exceeds the income limit as determined by decision block 74. If the total price is too high at this point, the bid is truncated as indicated by process block 76.

On the other hand, if the total price is acceptable, then at decision block 78 the ACU checks to see if the bid request is complete (e.g. the path is complete) as described in the job description of the bid request. If so, a success message is returned as indicated by process block 80 indicating the completed path, its cost, and the fact that it is a complete bid response. The ACU returns the successful bid response including the path and the total price. ACU's may contribute to a bid response even if they are already committed to another executing bid so long as the response does not require a change of state of the valve 20.

If the bid is not complete, then the ACU proceeds to decision block 82. Decision block 82 determines that the bids are only sent to valves that are not already on the bid path so as to prevent the possibility of loops. If the sub-bid will not create a loop, a sub-bid request is forwarded to these other ACU's that have the necessary capabilities and might complete the bid as indicated by process block 84. These sub-bids requests follow the topology of the actual distribution network as indicated and described above with respect to FIG. 7.

Figure 9:
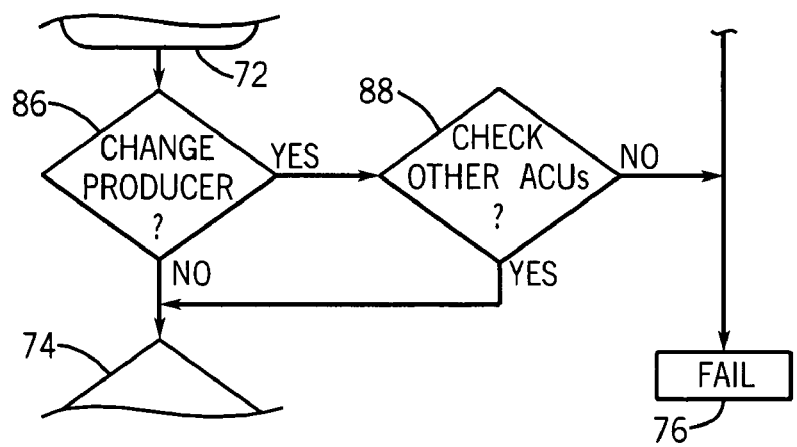
FIG. 9 is a fragmentary view of additional steps in the flowchart of FIG. 8, such steps as prevent mixing of water between chilled-water producers.

Referring now to FIG. 9, an additional decision block 86 may be placed in the program of FIG. 8 in the event that it is desired to preserve segregation of the chilled-water producers 14. As will be recalled with respect to FIG. 6, some segregation is preserved by increasing the relative price of the segregation valves 20 with respect to other valves 20. In the preferred embodiment, in the event the segregation valves 20 must be used, mixing of the water from chilled-water producers 14 is prevented by a polling between valves before they contribute to a bid. At decision block 86, before an ACU can join in a bid response, it must seek approval from directly connected valves 20 as indicated by decision block 88. Other valves must grant approval if they are closed, or if they are open and receiving water from the same chilled-water producers 14.

If at decision block 88 there are objections from any other valve 20, the bid is truncated as described above.

Referring now again to FIG. 2, as mentioned, the bid process may be initiated per process block 60 whenever chilled-water consumers 16 come on-line. Conversely, when a chilled-water consumer 16 goes off line, its valve may simply be opened and the commitment to the bid dissolved freeing up resources. Bids may also be initiated when new chilled-water sources 14 are added (for example during an upgrading process) eliminating the need for additional programming. Similarly, when a new valve 20 is added, it may automatically be incorporated into the system (after its connections have been programmed) during the next bid.

Active Diagnostics

The bidding process may also be initiated when a failure has been detected and the configuration of the chilled-water distribution system 12 must be changed. This detection may be the result of a chilled-water consumer 16 losing water and renewing a bid. Failed chilled-water producers 14 or valves 20 have self-diagnostics which may remove them from the bidding process. Alternatively, certain valves 20 may be manually removed from the system or placed in a lock mode (for example, to cordon off a leaking pipe) which also will remove them from participating in bids. The bidding process will automatically proceed to reconfigure the chilled-water distribution system 12 appropriately using the rules described above in light of such lost resources of valves or producers.

The present invention also contemplates anticipatory responses that may be taken by detecting failure before the loss of cooling water is noticed at the chilled-water consumers 16. In this regard, the present invention considers two methods of determining failure.

Figure 10:
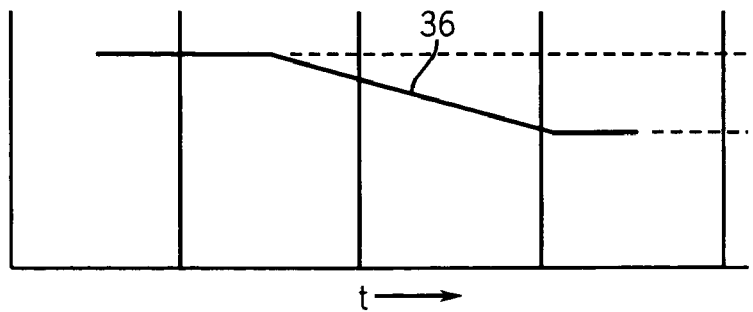
FIG. 10 is a graph showing water level in the accumulator tank of FIG. 3 such as may be used to deduce slow failures of the system.

Referring to FIGS. 3 and 10, in the first method, the tank water level 36 is tracked over time and if a predetermined decrease occurs within a predetermined time, it is assumed that there is a slow leak because the chilled-water system is closed. Normal tank level fluctuations are thus distinguished from significant but slow leaks that would be anticipated to produce a problem in the future.

Figure 11:
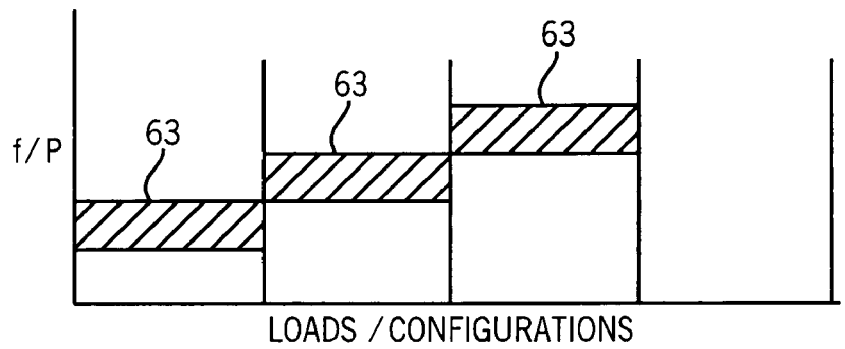
FIG. 11 is a graphical representation of a signature database that may detect more rapid failures of the system of FIG. 1.

Referring to FIGS. 11 and 3, the present invention also contemplates a detection system with faster response that may detect rapid drop in water pressure as indicating a failure. Generally, it must be understood that the water pressure fluctuates significantly depending on how many and which chilled-water consumers 16 are on line and depending on the particular connection of pipes 18. Thus, for example, three given chilled-water consumers 14 will provide a different pressure drop than three different chilled-water consumers 14 or the same three chilled-water consumers 14 connected via a different valve configuration. Further, water hammer effects cause pressure surges when valves open and close. Thus, no fixed threshold of pressure detection will suffice to detect rapid pressure drops caused by pipe failure.

Accordingly, the present invention provides a learning algorithm that may be implemented at any ACU that has pressure and flow monitoring capability. In this technique, a signature flow/pressure range 63 (indicating a conductance of the pipes of the system) is developed on a continuous learning basis for each combination of chilled-water consumer and each configuration of the pipes. These signatures may be collected in a table or functional surface that is updated when that combination occurs during normal operations (as validated by no failures occurring within a subsequent predetermined time) or during a training period when the resources are cycled through combinations. This learning is facilitated by the fact that the present system tends toward repeating configurations as a result of the money rules described above.

Once some number of signatures is developed, the conductance of the system is monitored with respect to the range for the signature associated with that particular load combination at a time after settling of any water hammer effects. Pressure deviation outside of that range triggers a failure signal.

Figure 12:
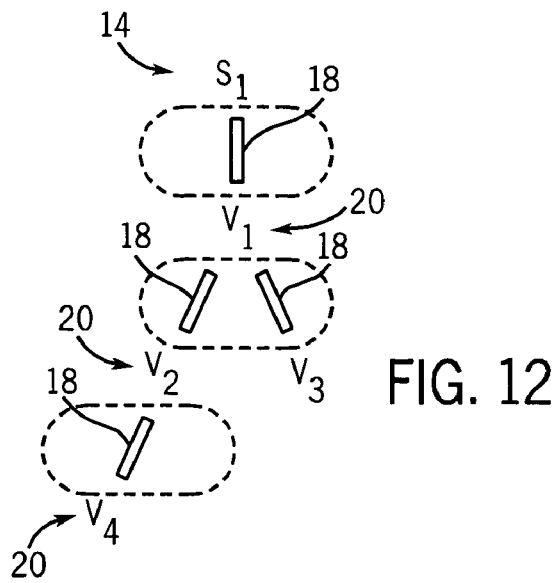
FIG. 12 is a depiction of a simplified network similar to that of FIG. 7 showing zones defined by the autonomous control units for isolation of a failure of the distribution network.

The failure may be isolated manually once brought to the attention of human operators and segregated by locking closed some valves 20. Preferably, however, the isolation of the failure is done automatically making use of the ACU architecture. Referring now to FIG. 12, a chilled-water producer $S_1$ may detect a pressure drop either through monitoring the tank per FIG. 10 or monitoring of the pressure zones per FIG. 11 indicating a leak. Alternatively, this process may be initiated by any ACU having tank or flow/pressure sensors.

Each ACU including $S_1$ has a copy of the paths associated with all executing bids and from these paths. $S_1$ may perform a simple tree based search for the source of leakage by selectively opening and closing valves 20 on those paths. For example, $S_1$ may instruct valve $V_1$ to close momentarily to see if the problem is remedied as manifested by the detection methods of FIG. 10 or 11. If so, the problem is below valve $V_1$, if not, the problem exists between $S_1$ and $V_1$, and $V_1$ may be locked or closed (removed from the bidding) and a rebidding process undertaken to reallocate the other chilled-water consumers 14.

If the closing of valve $V_1$ does correct the problem, valve $V_2$ may be closed to see if the problem has been remedied. If it has been remedied, the problem exists below valve $V_2$, in this case between valve $V_2$ and $V_4$. Valve $V_2$ may then be closed to try to isolate the problem. If this doesn't work, the problem exists between valve $V_1$ and valve $V_2$ or valve $V_1$ and valve $V_3$. In this case, valves $V_1$, $V_2$, and $V_3$ would need to be closed to accommodate the problem and a report indicating this problem can be forwarded to a monitoring system.

Referring momentarily to FIG. 4, if each valve 20 is instrumented to provide for pressure sensing and thus flow detection, the initiation of this isolation and detection may occur at any valve 20 as well. Desirably multiple ACU's will be equipped to provide this capability to prevent loss of centralized hardware.

A similar approach may be used to detect blockage of pipes in the event that the pressure has increased and these analogous processes may be affected on the return pipes 18b as will be understood from this description by one of ordinary skill in the art.

It is specifically intended that the present invention not be limited to the embodiments and illustrations contained herein, but include modified forms of those embodiments including portions of the embodiments and combinations of elements of different embodiments as come within the scope of the following claims. In particular, the present invention should be applicable to other types of distribution networks including those which distribute other materials such as fuel or air and those which distribute electrical power in the form of current under a voltage analogous to the pressure driving material fluids through a pipe.

We claim:

1. A control system for a distribution network having a set of distribution endpoints including at least one producer and consumer interconnected by a set of distribution resources including: a plurality of distribution lines joining the producers and consumers and switchable gates interconnecting the distribution lines, producers, and consumers, the control system comprising:
    a set of autonomous control units associated with at least some of the distribution endpoints;
    a set of autonomous control units associated with at least some of the distribution resources; and
    the autonomous control units executing a stored program and communicating with each other to:
    (a) implement a set of money rules to allocate money resources to the consumers and a set of pricing rules for distribution resources;
    (b) bid for distribution resources on behalf of consumers based on the money rules and pricing rules; and
    (c) select distribution paths between producer and consumer endpoints using distribution resources based on bid responses.

2. The control system of claim 1 wherein the distribution lines are pipes and the switchable gates are electrically operated valves.

3. The control system of claim 2 wherein the pricing rules provide higher prices to distribution between distribution endpoints requiring a greater number of distribution resources.

4. The control system of claim 3 wherein the pricing rules provide higher prices to valves that serve to segregate distributions related to separate producers.

5. The control system of claim 2 wherein the money rules provide greater money resources to a bidder if no successful bids are obtained.

6. The control system of claim 2 wherein the money rules provide initial money resources to a bidder based on the price of a previously accepted bid.

7. The control system of claim 2 wherein the autonomous control units are implemented in spatially separated hardware intercommunicating on a network and the stored program is divided among the autonomous control units.

8. The control system of claim 7 wherein the autonomous control units are located proximate to the distribution resources or distribution endpoints with which they associate.

9. The control system of claim 2 wherein the distribution network provides distribution of a resource selected from a group consisting of: water, refrigerating liquid, air, pressurized air, and fuel.

10. The control system of claim 2 wherein the stored program executed by the autonomous control units allows distribution resources to participate in multiple bids related to different distribution consumers permitting consistent use of the distribution resource.

11. The control system of claim 2 wherein the autonomous control units associated with valves may receive an instruction causing them to close and remove themselves from future bidding;
    whereby pipe failures may be isolated.

12. The control system of claim 2 wherein the consumers are assigned priorities and wherein, when all bids associated with competing consumers cannot be satisfied, the stored program executed by the autonomous control units selects among competing consumers by priority.

13. The control system of claim 2 wherein the autonomous control units associated with consumers may receive an instruction causing them to remove themselves from the system and future bidding;
    whereby resources can be released for emergency conditions.

14. The control system of claim 2 further including a monitor detecting leakage from at least one point in the distribution network.

15. The control system of claim 14 wherein the network monitor monitors a volume of material flowing in the pipes to detect a leakage when this volume is above a predetermined rate.

16. The control system of claim 14 wherein the monitor comprises at least one flow rate and pressure sensors attached to a distribution line monitor changes in flow conductances to detect a leakage.

17. The control system of claim 16 wherein the monitors collect historical information of flow conductance as a function of distribution line configurations to create a set of signatures and wherein leakage is detected when flow conductance deviates by more than a predetermined amount from the signature for the distribution line configuration.

18. The control system of claim 14 wherein the monitor is implemented by a portion of the stored program running in at least one autonomous control unit.

19. The control system of claim 14 wherein the monitor is implemented redundantly by multiple portions of the program running in multiple autonomous control units.

20. The control system of claim 14 wherein the monitor controls the valves to identify and isolate a distribution resource causing the leakage.

21. The control system of claim 1 wherein the network provides redundant distribution producers.

22. The control system of claim 1 wherein the network provides redundant pipes.

23. The control system of claim 1 wherein the bidding is propagated only between distribution resources directly connected by pipes.

24. A control system for a distribution network having a set of distribution endpoints including at least one producer and consumer interconnected by a set of distribution resources including: a plurality of distribution lines joining the producers and consumers and switchable gates interconnecting the distribution lines, producers, and consumers, the control system comprising:
- a set of spatially separated control modules associated with at least some of the distribution resources in proximity of the distribution resources; and
- the control modules executing a stored program and communicating with each other to connect distribution resources on behalf of producers and consumers to provide distribution between producers and consumers as at least partially determined by a consumer priority.

25. The control system of claim 24 wherein the plurality of distribution lines are pipes and the switchable gates are electrically operated valves.

26. The control system of claim 24 wherein the distribution network provides redundant distribution producers.

27. The control system of claim 24 wherein the distribution network provides redundant pipes.

28. The control system of claim 24 wherein the distribution network provides a distribution of a resource selected from a group consisting of: water, refrigerating liquid, air, pressurized air, and fuel.

* * * * *